(12) United States Patent
Hamalainen

(10) Patent No.: US 9,420,166 B2
(45) Date of Patent: Aug. 16, 2016

(54) METHOD AND APPARATUS FOR ENHANCED AUTOMATIC ADJUSTMENT OF FOCUS, EXPOSURE AND WHITE BALANCE IN DIGITAL PHOTOGRAPHY

(75) Inventor: Matti Hamalainen, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 38 days.

(21) Appl. No.: 14/378,514

(22) PCT Filed: Feb. 13, 2012

(86) PCT No.: PCT/FI2012/050132
§ 371 (c)(1),
(2), (4) Date: Oct. 13, 2014

(87) PCT Pub. No.: WO2013/121073
PCT Pub. Date: Aug. 22, 2013

(65) Prior Publication Data
US 2015/0029357 A1     Jan. 29, 2015

(51) Int. Cl.
| H04N 5/232 | (2006.01) |
| H04N 9/73 | (2006.01) |
| G02B 7/36 | (2006.01) |

(52) U.S. Cl.
CPC .............. *H04N 5/23216* (2013.01); *G02B 7/36* (2013.01); *H04N 5/232* (2013.01); *H04N 5/23222* (2013.01); *H04N 9/735* (2013.01)

(58) Field of Classification Search
CPC .......... H04N 5/23216; H04N 5/23222; H04N 5/232; H04N 9/735; G02B 7/36
See application file for complete search history.

(56) References Cited

U.S. PATENT DOCUMENTS

| 7,440,021 B2 * | 10/2008 | Ono ..................... H04N 5/2351 348/221.1 |
| 7,446,810 B2 * | 11/2008 | Ono .................. H04N 5/23212 348/345 |
| 7,630,005 B2 * | 12/2009 | Takei ..................... G06T 5/002 348/207.99 |
| 7,872,671 B2 * | 1/2011 | Shimada ............ H04N 5/23248 348/208.6 |

(Continued)

FOREIGN PATENT DOCUMENTS

| JP | 2008104070 | 5/2008 |
| JP | 2008107565 | 5/2008 |

OTHER PUBLICATIONS

English Language Machine Translation of Japanese Patent Publication No. 2008104070—20 pages.

(Continued)

*Primary Examiner* — Luong T Nguyen
(74) *Attorney, Agent, or Firm* — Locke Lord LLP

(57) ABSTRACT

A method, apparatus and computer program are described where signals are received from a camera unit (310) having an image sensor with a plurality of image detectors. The signals include first signals received from first pixel detectors corresponding to a first image area and second signals received from second pixel detectors corresponding to a second image area surrounding the first image area. Camera settings of a setting group are automatically controlled (340) based on the first signals. The settings group has at least one of focus control, exposure control and white balance control. Changes in the setting group are predicted based on the second signals. A change is detected in the first image area and used to adapt the automatic control (340) of the camera settings of the settings group. Control signals are output to the camera unit (310) to control (340) the camera settings of the settings group.

18 Claims, 8 Drawing Sheets

(56) References Cited

U.S. PATENT DOCUMENTS

| | | | |
|---|---|---|---|
| 2002/0102103 A1 | 8/2002 | Kindaichi et al. | |
| 2005/0253953 A1 | 11/2005 | Ono | |
| 2005/0253956 A1 | 11/2005 | Ono | |
| 2007/0046783 A1 | 3/2007 | Shimada | |
| 2008/0069553 A1 | 3/2008 | Li | |
| 2008/0095523 A1 | 4/2008 | Schilling-Benz et al. | |
| 2011/0211108 A1 | 9/2011 | Pollard | |
| 2011/0249140 A1* | 10/2011 | Fujiwara | H04N 5/23254 348/223.1 |
| 2012/0105668 A1* | 5/2012 | Velarde | H04N 5/232 348/223.1 |

OTHER PUBLICATIONS

English Language Machine Translation of Japanese Patent Publication No. 2008107565—29 pages.

International Search Report for International Application No. PCT/FI2012/050132—6 pages, mailing date Dec. 18, 2012.

PCT Written Opinion of the International Searching Authority for International Application No. PCT/FI2012/050132—9 pages, mailing date Dec. 18, 2012.

EPO Communication and Extended Search Report for European Application No. 12868489.1—mailed Sep. 10, 2015, 7 pages.

* cited by examiner

METHOD AND APPARATUS FOR ENHANCED AUTOMATIC ADJUSTMENT OF FOCUS, EXPOSURE AND WHITE BALANCE IN DIGITAL PHOTOGRAPHY

TECHNICAL FIELD

The present application generally relates to enhanced automatic adjustment of focus, exposure and white balance in digital photography.

BACKGROUND

In digital photography, images are typically formed by passing light from an object through an objective and infrared (IR) filter onto an image sensor or image capture unit such as a CMOS or CCD unit. The image capture unit typically comprises some millions of pixel sensing elements for forming corresponding pixels of digital images. Modern digital cameras typically have automatic focus control (AF), automatic exposure (AE) i.e. adjustment of the opening of the dimming shutter and automatic white balance adjustment (AWB) for producing images that look good.

During the development of digital cameras, numerous improvements have been made in each of the aforementioned AF, AE and AWB. Typically they still operate so that one or more objects of interest are identified in images produced by the image sensor and then the image capture unit is adjusted to optimize the appearance of the objects of interest. For example, a face can be detected based on characteristic features of faces, the focus be adjusted such that the face is in focus e.g. so that contrast between adjacent points is at its maximum. The exposure can be so controlled that with a reasonable shutter period and the amplifier gain controlling the sensitivity of the sensor output (corresponding to ISO setting), the pixels of images become sufficiently illuminated to make dark parts of images perceivable while the pixels of bright parts of images do not become too much illuminated. The white balance is adjusted so that the colors of the images would appear natural. For instance, the proportional light intensities measured in different three color channels of the image sensor can be compared to pre-set parameters that characterize typical illuminants. Then, the brightness of pixels of each color channel is adjusted to compensate for the typical deviation from that caused by natural light.

The adjustment of the AF, AE and AWB is typically performed in a cycle in which all these three different important factors of digital photography become gradually adjusted. In video imaging, rapid changes are often avoided in order to avoid nauseous appearance of produced video footage.

SUMMARY

Various aspects of examples of the invention are set out in the claims.

The inventor realized that in still imaging, however, each image is viewed independent of others and it would be beneficial to rapidly adapt the focus, exposure and white balance so that a larger proportion of snaps can be successful. Some of the example aspects and embodiments of the present invention employ this realization.

According to a first example aspect of the present invention, there is provided an apparatus, comprising:

an input configured to receive signals from a camera unit having an image with a plurality of image detectors, the signals comprising first signals received from first pixel detectors corresponding to a first image area and second signals received from second pixel detectors corresponding to a second image area surrounding the first image area;

at least one processor configured to:
receive the first and second signals from the input;
automatically control camera settings of a setting group comprising at least one of focus control, exposure control and white balance control, based on the first signals;
predict changes in the setting group based on the second signals; and
detect a change in the first image area and to use the predicted changes to adapt the automatic control of the camera settings of the settings group;
and an output configured to output to the camera unit control signals configured to control the camera settings of the settings group.

The change in the first image area may comprise changing field of view visible to the image sensor.

The change in the first image area may comprise digital panning. In digital panning, the first image area may move with respect to the total area covered by the first image area and the second image area.

According to a second example aspect of the present invention, there is provided a method comprising:

receiving signals from a camera unit having an image sensor with a plurality of image detectors, the signals comprising first signals received from first pixel detectors corresponding to a first image area and second signals received from second pixel detectors corresponding to a second image area surrounding the first image area;

automatically controlling camera settings of a setting group comprising at least one of focus control, exposure control and white balance control, based on the first signals;

predicting changes in the setting group based on the second signals;

detecting a change in the first image area and to use the predicted changes to adapt the automatic control of the camera settings of the settings group; and outputting to the camera unit control signals configured to control the camera settings of the settings group.

According to a third example aspect of the present invention, there is provided a computer program comprising computer executable program code, configured to cause an apparatus, when executing the program code, to perform the method of the second example aspect.

According to a fourth example aspect of the present invention, there is provided a computer readable memory medium storing the computer program of the third example aspect.

According to a fifth example aspect of the present invention, there is provided a computer readable memory medium encoded with instructions that, when executed by a computer, perform the steps of the method of the second example aspect.

According to a sixth example aspect of the present invention, there is provided an apparatus, comprising:

an input means for receiving signals from a camera unit having an image with a plurality of image detectors, the signals comprising first signals received from first pixel detectors corresponding to a first image area and second signals received from second pixel detectors corresponding to a second image area surrounding the first image area;

at least one processor means comprising:
means for receiving the first and second signals from the input;
means for automatically controlling camera settings of a setting group comprising at least one of focus control, exposure control and white balance control, based on the first signals;

means for predicting changes in the setting group based on the second signals; and means for detecting a change in the first image area and to use the predicted changes to adapt the automatic control of the camera settings of the settings group;

and an output means for outputting to the camera unit control signals configured to control the camera settings of the settings group.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention.

Some example embodiments of the invention may be presented only the detailed description of this document or in this summary, and/or only with reference to certain example aspects of the invention. It should be appreciated that embodiments relating to one example aspect or one embodiment may apply to other example aspects or embodiments as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 13 of the drawings.

Various examples will next be described to illustrate different example embodiments of the invention. The structures of these embodiments may be varied in many ways and it makes the description simpler and clearer to first present a basic system in which the embodiments are described, then discuss various operations according to different example embodiments and finally explain various structures with which these operations can be implemented.

Figure 1:
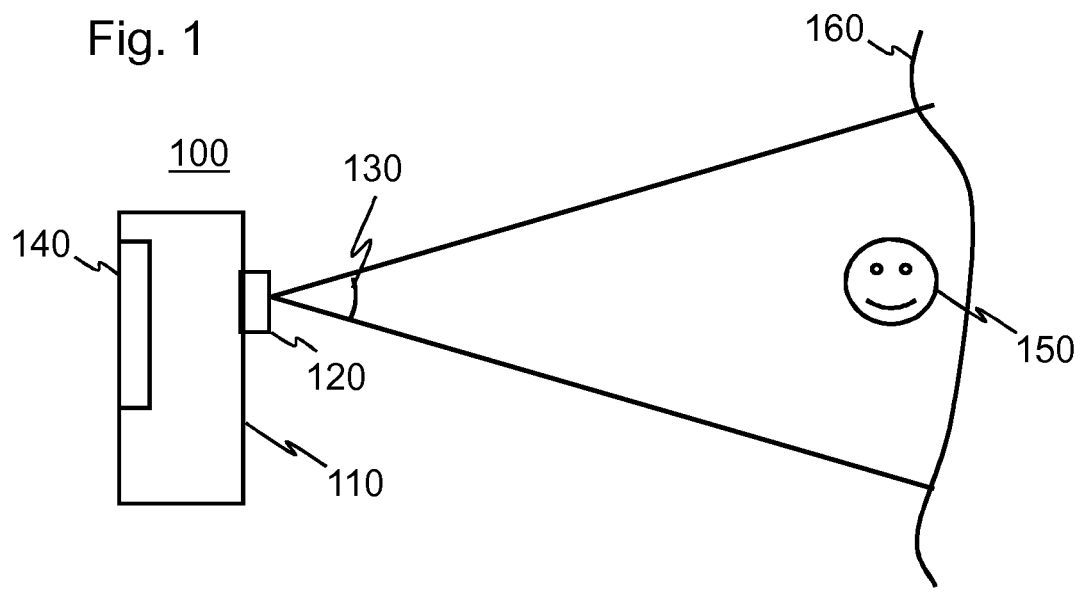
FIG. 1 shows a schematic system for use as a reference with which some example embodiments of the invention can be explained.

FIG. 1 shows a schematic system 100 for use as a reference with which some example embodiments of the invention can be explained. The system 100 comprises a device 110 such as a camera phone, gaming device, security camera device, personal digital assistant or a digital camera having a camera unit 120 with a field of view 130. The device 110 further comprises a display 140. FIG. 1 also shows an image object 150 that is being imaged by the camera unit 120 and a background 160 such as a curtain behind the image object.

In FIG. 1, the image object 150 is relatively small in comparison to the field of view at the image object 150. Next to the image object 150, there is a continuous background 160. While this setting is not by any means necessary, it serves to simplify FIG. 1 and description of some example embodiments of the invention.

Figure 2:
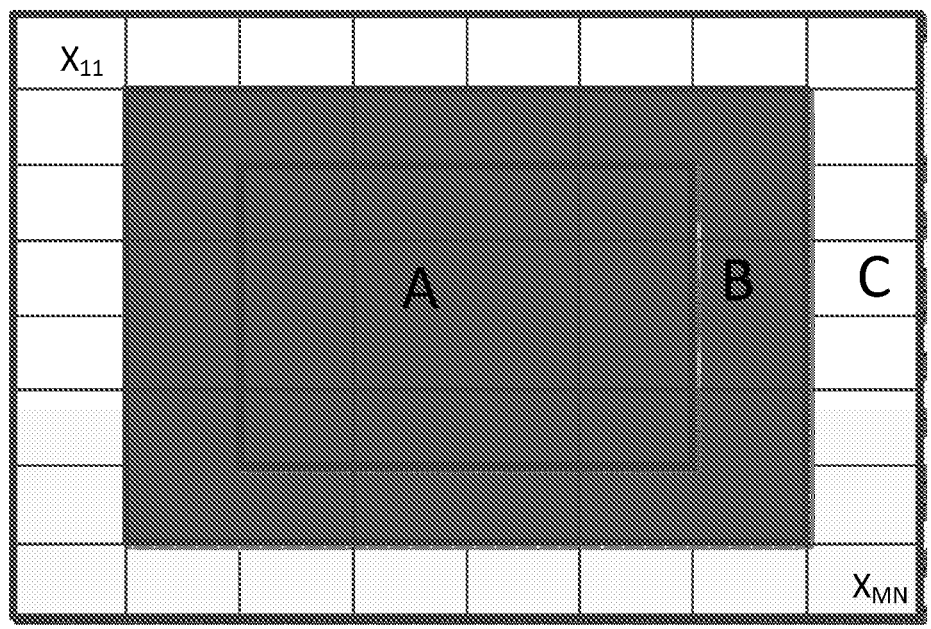
FIG. 2 shows an illustration of division of an image sensor into various image segments according to an example embodiment.

FIG. 2 shows an illustration of division of an image sensor (ref. 1264 in FIG. 13) into various image segments. An entire image area C of the image sensor comprises M columns and N rows of image segments in a regular matrix. Each image segment comprises a number of pixel detectors. Within the entire image area C, there is a first image area A that corresponds to the part of the image sensor that is producing a present digital camera image. Around the first image area A, there is a second area B within the entire area C. The pixel detectors within the first image area A and within the second image area B are referred to as first pixel detectors and second pixel detectors, respectively. The first image area is also referred to as the output area or output frame area. The second image area is also referred to as the prediction area.

The most common set of camera parameters is referred as 3A, which is referring to Auto Focus (AF), Auto Exposure (AE), and Auto White Balance (AWB). In some existing closed loop 3A systems:

Auto Exposure (AE) system collects luminance data (before gamma correction) from the sensor and controls exposure time, analog gain and iris of the camera for a AE target;

Auto Focus (AF) collects focus value (before edge enhancement) and drives the optics for a desired image plane with an actuator or AF motor for a desired focus value;

Auto White Balance collects color statistics after white balance and controls the color gain for a desired white balance.

In some digital cameras, there is a fixed focus or manual focus so that there is no autofocus at all. Also, it is possible to switch off the automatic exposure and/or automatic white balance control. Hence, the camera settings adjusted in the control loop are here referred to as the settings group, which comprises one or more of the focus, exposure and white balance settings. It is noticed that white balance can be controlled in different parts of image processing before gamma correction and tone mapping type of as nonlinear operations affecting color histogram, but depending on the processing pipeline implementation there may be advantages to compensate white balance as a part of preprocessing chain based on image statistics collected jointly for multiple algorithms. For instance, in some example embodiments, the image sensor produces colors with greater bit depth than what is enabled by the format of image file used or an intermediate data bus or other component.

Figure 3:
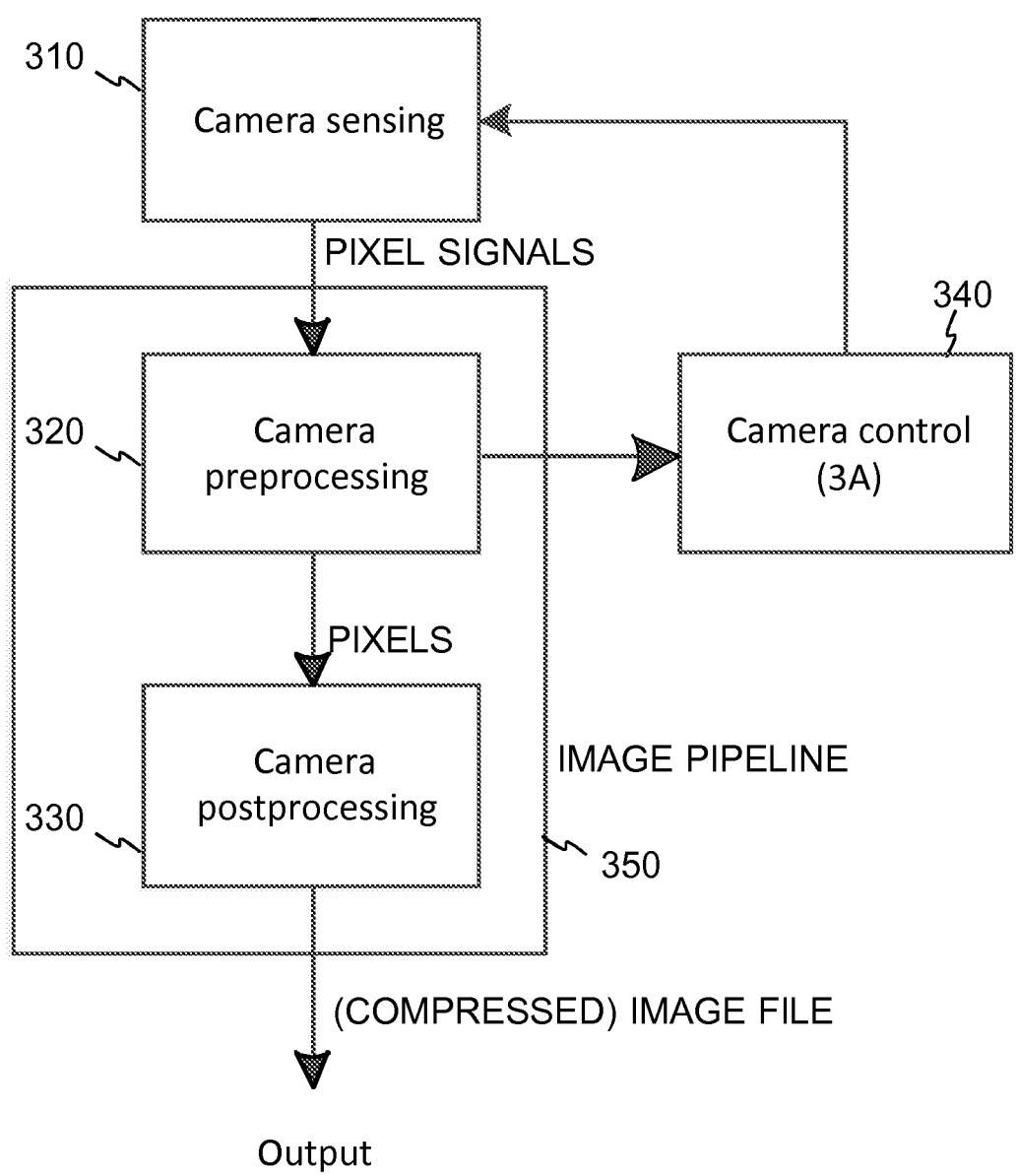
FIG. 3 shows a schematic block diagram of some functional elements of a digital camera according to an example embodiment.

FIG. 3 shows a schematic block diagram of some functional elements of a digital camera. At camera sensing 310 light arrives through an objective and results in pixel signals being formed and provided to a camera preprocessing 320. In the preprocessing, pixels are formed by analog-to-digital converting the pixel signals. The camera pre-processing 320 and camera post-processing 330 are also referred to as an image pipeline or camera processing pipeline 350.

The pixels are supplied to an output image post processing 330 where an image is formed from the pixels. The image is formed, for instance, according to user selected aspect ratio for images (such as 16:11, 3:2 or 4:3) and/or compressed and/or processed according to desired effects if supported by the digital camera (such as sepia).

A camera control loop 340 is formed by a camera control function 340 that receives the first and second signals from the camera sensor. In some example embodiments, the camera control function 340 receives pixels of all pixel detectors of the image sensor (1264). For understanding following embodiments, it can be supposed that the entire image area C (FIG. 2) does not exist or that the second area extends all the way to the outer borders of the entire image area C. For explaining further the camera control function 340, let us turn to FIGS. 4 to 7.

Figure 4:
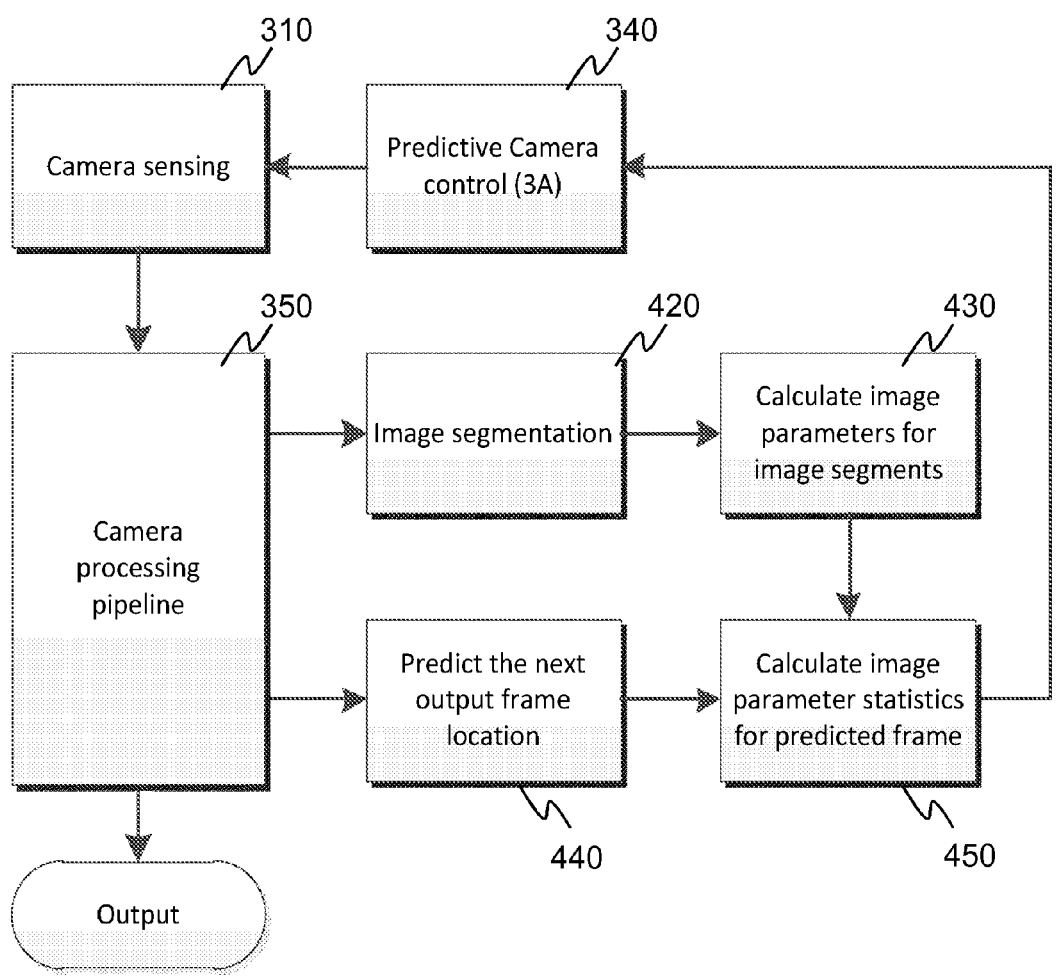
FIG. 4 illustrates a system for predictive 3A adjustment according to an example embodiment.
Figure 5:
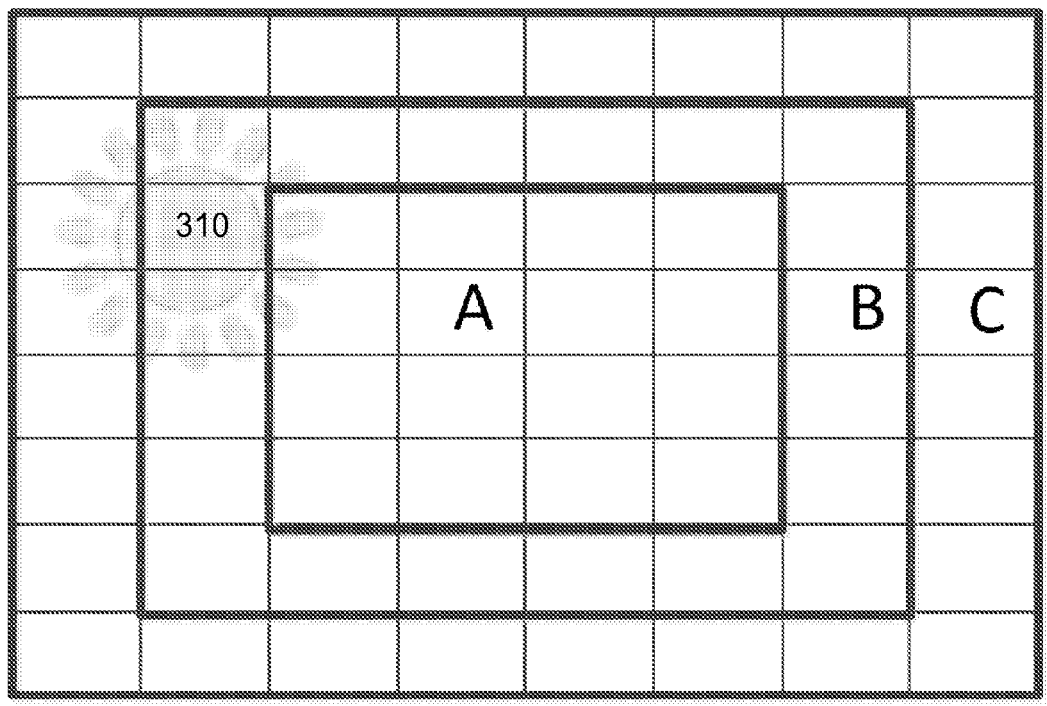
FIGS. 5, 6 and 7 illustrate an example of dynamic image content change caused by image panning according to an example embodiment.

FIG. 4 illustrates a system for predictive 3A adjustment. The camera sensing (e.g. image sensor) captures an image with current camera parameters. The captured image is passed to the camera processing pipeline 350. The pipeline 350 provides the image content to an image segmentation block 420 that segments the image into deterministic image segments. In one example embodiment the image segments are defined independent of the image content. Such content-independent image segments are illustrated as rectangular tiles Xij, or macro pixels in FIG. 2 and also in FIG. 5. In block 430, image parameters are calculated for predictive 3A control for each image segment for predicting the next output frame. FIG. 5 exemplifies a case where only a portion of the entire image area C is used as prediction area B surrounding the predicted output area A output. The reducing of the size of the prediction area B may reduce the computational load when the final output image frame A is considerably smaller compared to the entire image area C. When significant image cropping is applied, the reduced prediction area may provide sufficient information for typical camera movements, image scaling and digital image stabilization. In some other example embodiments, or when the size of the final output frame approaches the entire image area C, the entire image area C may be used as the prediction area B.

In parallel, in the example embodiment of FIG. 4, the camera processing pipeline 350 provides image data for output image frame predictor 440 for estimating the location and the size of the next output frame. In the typical case the location and the size of the image frame is not changing radically from frame to frame. Algorithms such as digital image stabilization or image zooming may cause adjusting of these parameters from frame to frame. The location of the predicted frame A is calculated to estimate the next image frame location in the predictor 440. Armed with the predicted output frame location, the calculation of output image parameters statistics can be performed in the next block 450. The image parameters statistics are calculated, for instance, by applying spatial weighting dependent on the output frame location. For instance, known algorithms can be used that detect the brighter illumination of sky or snow in winter photographs for context adaptive auto exposure (AE) based on the predicted next output frame location.

The collected image parameter statistics calculated from the output frame area A are passed forward to Predictive Camera control block 340 that adjusts the camera parameters, such as 3A parameters, in advance for the capture of the next output frame.

The inventor has realized that in digital imaging applications the speed of camera is often critical for good user experience. There are e.g. numerous photographic images taken from children only partly visible in the images because of slow camera action. One significant cause for this problem is the delay of the camera control loop that adjusts the camera parameters based on the camera settings and image content. As the user is also often moving the camera, the image content is dynamically changing, causing the need for repeated readjustment of the camera control parameters.

Legacy camera control systems control of the camera parameters based on the image that is captured. In an example embodiment of the present invention shown in FIG. 4, the future location of the output frame is estimated as well as the camera parameters from the image content of the current image information using the spatial image information received from the image area surrounding the current output frame. Thus, spatial changes in the image content can be predicted in advance. In result, various irrecoverable faults in digital images may be avoided.

For instance, failure in adjusting the settings group parameters can easily destroy the image quality that severely that no post processing can remedy the lost quality in the pre-processing phase of the imaging chain. For example, if the image is heavily overexposed, the image contains very little details to be enhanced by post processing.

The inventor has also recognized that in a practical imaging situations, the image content can vary considerably in spatial image scene. For example, if the picture is taken in backlighting situation, e.g. against the sun (see FIGS. 6 and 7), a very small change in camera orientation can cause significant changes in camera exposure parameters because the camera sensor is not able to capture the entire dynamic range of the image scene. Similarly, indoor pictures can have very variable illumination formed by, for instance, flash light mostly visible at objects nearest to the camera, natural light at windows and bright halogen spotlights near given objects. Hence, image composition plays an important role on what type of camera parameters are optimal for the picture at hand. Similarly during the video capture, movement of the camera, e.g. during panning, can cause rapid changes in 3A parameters which becomes very disturbing if the 3A control loop is too slow.

Figure 6:
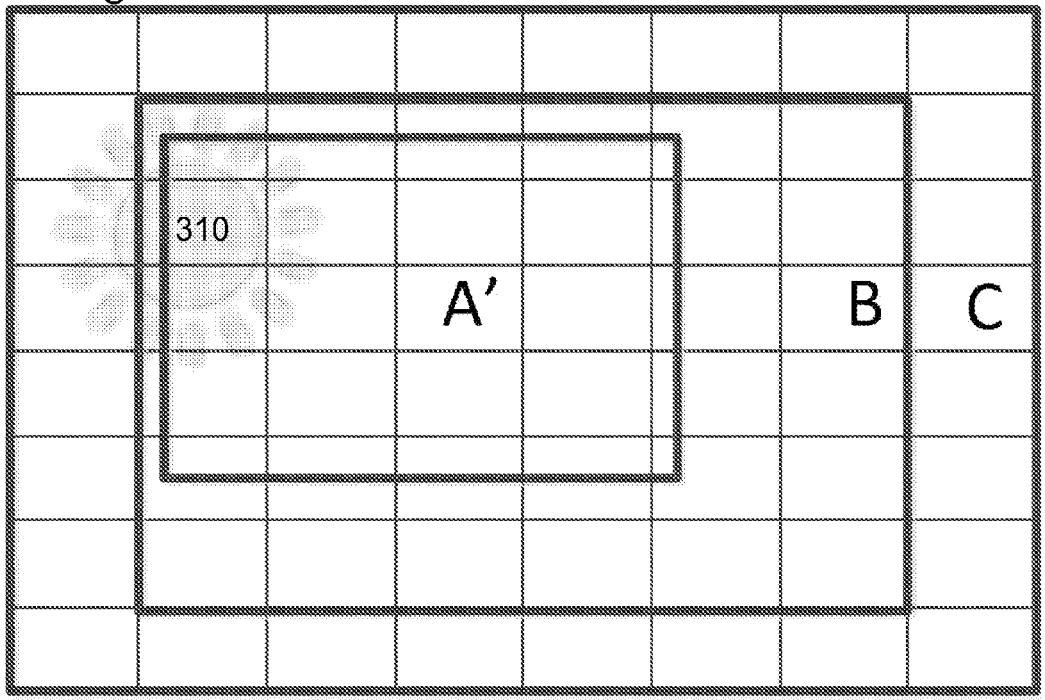
Figure 7:
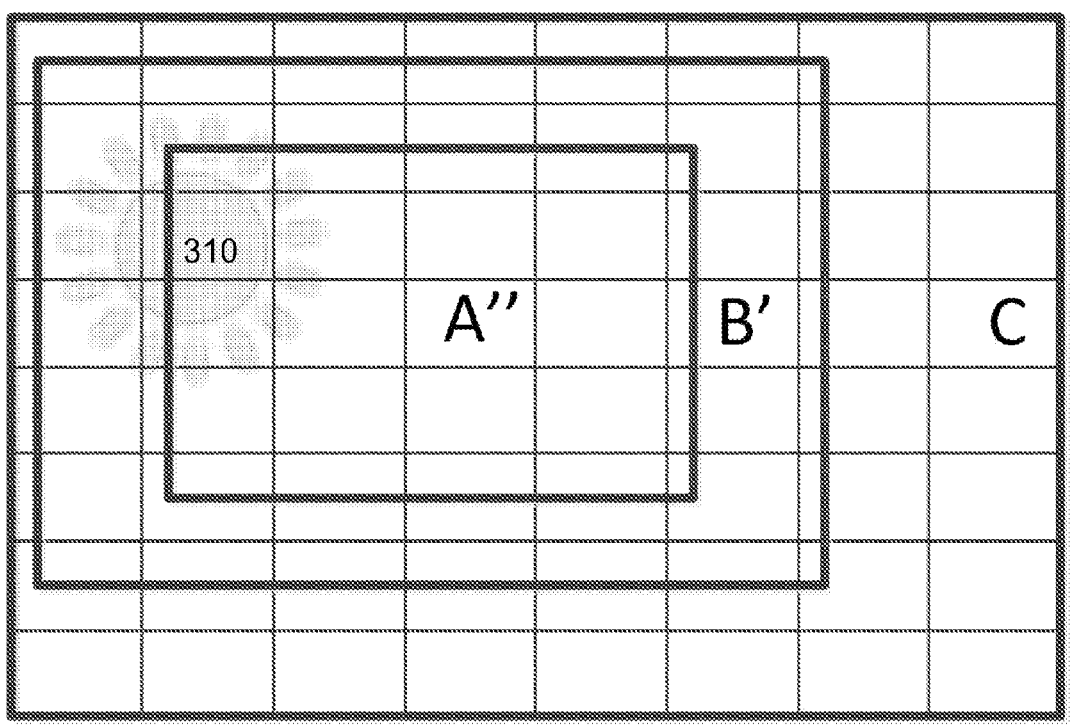

FIGS. 5, 6 and 7 illustrate an example of dynamic image content change caused by image panning.

In FIG. 5, the image area A of the current output frame does not include the sun 310 in the image area. However, both the prediction area B and the total image area C have information about the sun 310.

FIG. 6 illustrates the prediction step where the output frame location is predicted to be at A'. In this case, the image segments in the predicted output frame location A' are used to predict the correct camera parameters, such as auto exposure (AE), for the predicted next output frame location. Next, the prediction area B can be updated to a new location B' and the next output frame location A" can be predicted based on this updated prediction area. This process can be repeated from frame to frame.

Depending on the implementation of the camera sensing it is possible to control the camera sensor 1264 spatially and apply different camera control parameters to different image areas. This invention is not limited by the number or the shape of different areas the camera sensor that can be controlled either partly or fully independently.

In one example embodiment, the segmentation is also adapted based on the image content e.g. by changing the size and/or number of image segments.

In an example embodiment, the camera control function 340 looks into the prediction area B and produces corrective parameters. The corrective parameter are associate to given image segments in one example such that when the image segment in question becomes a member of the first image area, the associated corrective parameters are used to accelerate correcting of the camera preprocessing. For instance, image segments at the bright sunlight (in the second image area) would be in advance associated with exposure control correction parameters suited to quickly adapt to the changed first image area A'.

In the particular case of a sun or other dominant source of light, it is deduced in one embodiment from the brightness and shape that the segments indeed are corresponding to an image or part of image of the sun or other unlikely desired imaging object. As the sun is not usually the object of photographing, the correction parameters can be set in advance to prevent the normal dimming with AE control to avoid a likely object (such as a child e.g. at the reference sign A') becoming very dark in the image. On the other hand, if the sun shone from behind the camera and there were a light-colored object in place of sun in FIGS. 5 to 7, the light-colored object could be determined in advance as a likely image object of interest by the camera control function 340. In such a case, the correction parameters would be set to accelerate AE control with instruction to shorten the exposure time or aperture when the light-colored object becomes visible in the first image area.

The camera control 340 can also send information to other parts of the camera system for example to change or adapt the camera program. An example of this would be to activate the usage of flash to compensate the large difference in illumination levels in the case of backlighting situation.

Like adjusting of the exposure, the focus can be adjusted when a likely interesting object becomes visible in the (changed) first image area A'. One known technique for detecting the likely interesting objects is face recognition. A face can be detected using the second image area, possibly in conjunction with the first image area, much before the face becomes visible in the first image area. Moreover, with more time, edges of image objects can be tracked as in one example embodiment in order to deduce whether the new likely interesting image object is in the focus range and/or to which direction the focus should be changed in order to focus to the new likely interesting image object. In case of using secondary distance measurement unit, the distance to the likely interesting image object can be measured already in advance without affecting the current focusing, as in one example embodiment.

The white balance is determined in one example embodiment from three color channels provided by the image sensor (1264). As the white balance may vary over the field of view seen by the image sensor (1264), in an example embodiment the white balance is set based on the proportional strength of signals of different color channels of the first pixel detectors that represent the first image area A. Assume that the sun is appears in the second image area through a window and most of the first image area A is illuminated by bright fluorescent or halogen illuminants. The white balance would be set accordingly to accommodate for the mostly artificial illumination. On the changed first image area A', on the other hand, the left-hand side part of the image would be strongly affected by the sunshine. With a simple white balance adjustment, the sunshine could be dominant and the white balance could become changed accordingly on moving from the first image area A to the changed first image area A'.

In an example embodiment, the strong illuminant such as the sun is seen in the second image area by the camera control function 340. With relatively long time available, e.g. over a period of few successive image frames produced on the viewfinder 140, the camera control function determines in one example embodiment the likely effect of this strong illuminant on the likely interesting image objects. If no other image objects are found, the strong illuminant itself is the likely image object and the white balance correction parameters are set for corresponding image segments accordingly. However, if the likely image object of interest is found relatively far from the strong illuminant or in far lower light indicative of little illumination by the strong illuminant, the camera control function 340 sets the associated correction parameters to force neglecting the effect of the strong illuminant on white balance adjustment. In this example embodiment, the images of the changed first area may well look unnatural at the sun, but much of the image there can also be overexposed to white so that the white balance has little impact anyway. Besides, the likely image object of interest is now imaged using the color temperature that is better suited for that part of the image and the result in terms of subjective image quality should be far better than otherwise.

Figure 8:
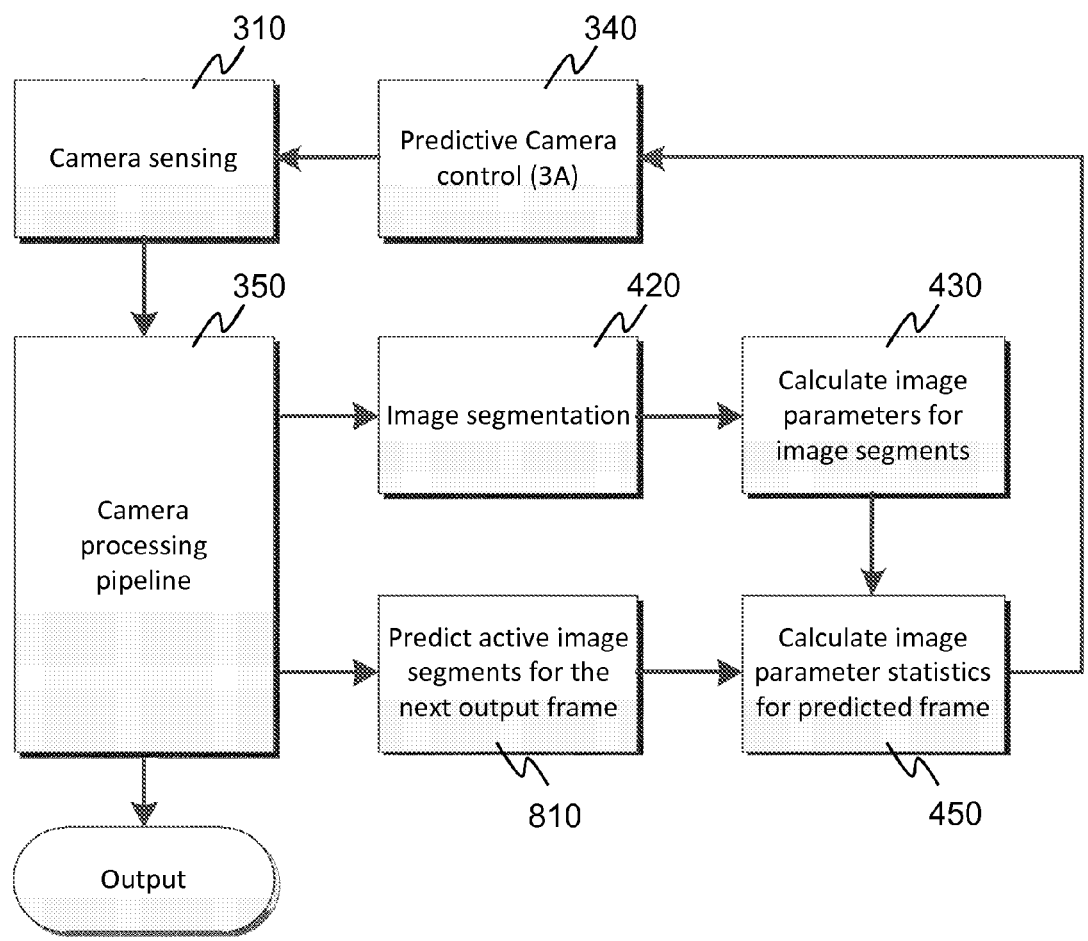
FIG. 8 illustrates a camera control procedure with dynamic image segmentation according to an example embodiment.

FIG. 8 illustrates a camera control procedure with dynamic image segmentation according to an example embodiment. The image segments are formed based on the contents of the image in a prediction block 810. Each image segment is selected e.g. so as to define one image object. The image object can be stationary or moving.

Figure 9:
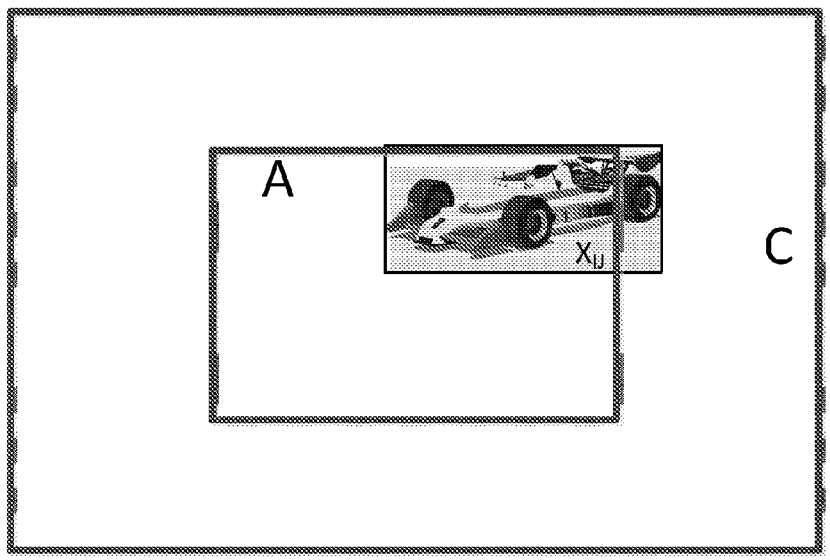
FIGS. 9, 10 and 11, illustrate an example of dynamic segmentation according to an example embodiment.
Figure 10:
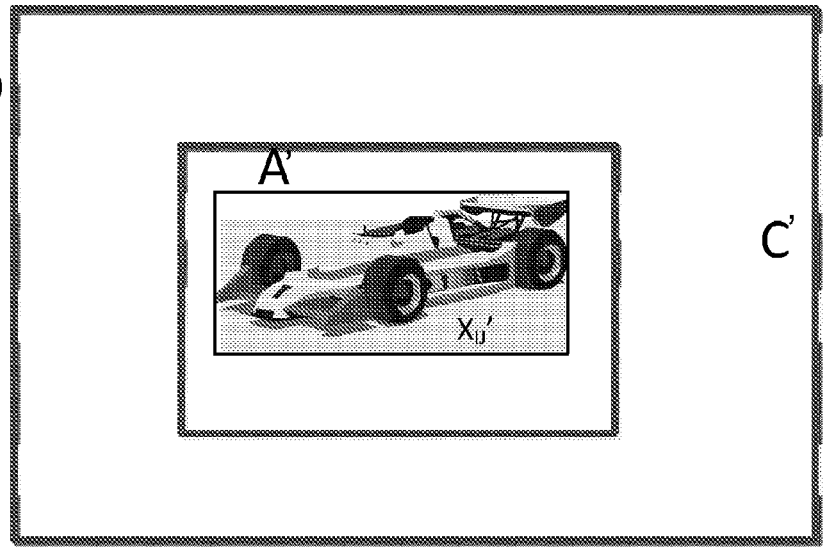
Figure 11:
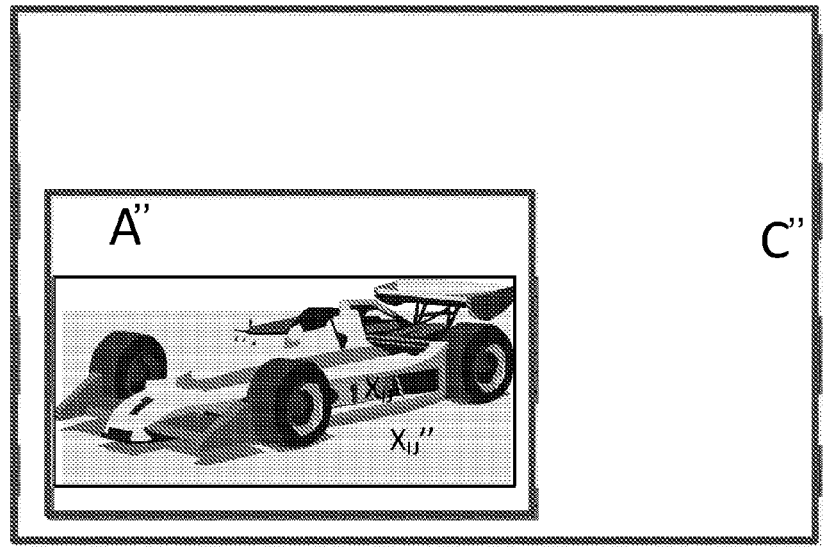

FIGS. 9, 10 and 11, illustrate an example of dynamic segmentation according to an example embodiment. A car is segmented as an object segment Xij and the segmentation algorithm is tracking the objects and image segments from frame to frame. Similarly to the example embodiment of FIG. 4, the image parameters are calculated for each segment. As the image segments are moving in image area, in addition the predicting the output frame location A', the algorithm further predicts 810 the active image segments that are located entirely or partially within the predicted output frame A'. The entire image area may be impractical to segment into isolated objects. Hence, a background object can be defined as one of the objects to be tracked. As with FIG. 4, the image parameter statistics can be calculated for the predicted frame location containing the image segments. The image parameter statistics are then passed forward to predictive Camera control (3A) for the adjustment of the camera control parameters for the next image frame. The dynamic segmentation based predictive camera control can be used, for instance, in fixed camera installations that monitor static scene with moving objects, such as surveillance cameras or passport booth cameras.

In FIG. 9, it is identified that an image segment Xij enters the output image area A. In FIG. 10, the movement of the object corresponding to the segment Xij' and the location of the next output frame A' are estimated. This procedure is repeated for FIG. 11 situation by predicting the output frame location A" and object segment Xij", correspondingly. This example illustrates the predictive auto focus functionality that detects an object and predicts the focus parameters of the camera for the objects visible within the output frame area A. In this example there is no separate prediction area B, but the object estimation is done for the entire image area i.e. B=C.

The anticipating calculation of image parameters for image segments can be subsequently reused for image segments of later images.

Figure 12:
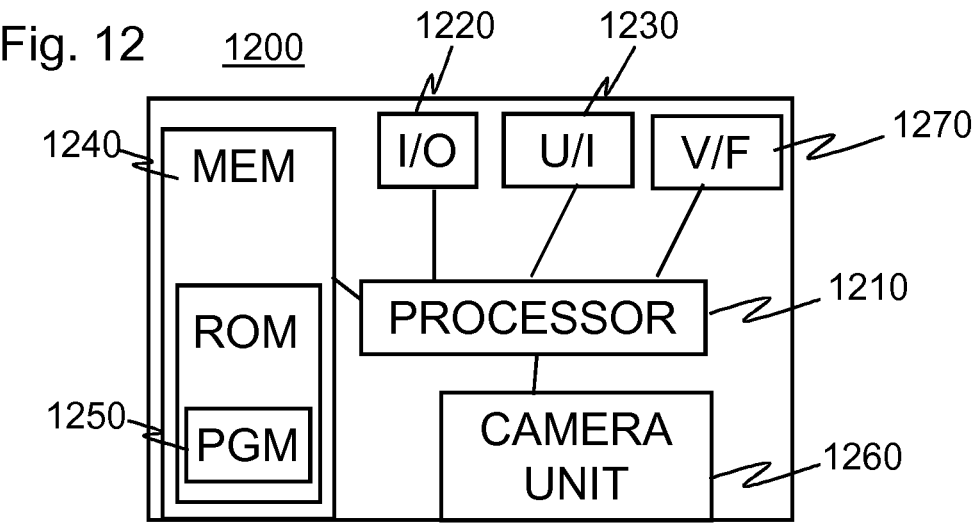
FIG. 12 shows a block diagram of an apparatus 1200 of an example embodiment of the invention.

FIG. 12 shows a block diagram of an apparatus 1200 of an example embodiment of the invention. The apparatus 1200 is suited for operating as the device 110. The apparatus 1200 comprises a communication interface 1220, a processor 1210 coupled to the communication interface module 1220, and a memory 1240 coupled to the processor 1210. The memory 1240 comprises a work memory and a non-volatile memory such as a read-only memory, flash memory, optical or magnetic memory. In the memory 1240, typically at least initially in the non-volatile memory, there is stored software 1250 operable to be loaded into and executed by the processor 1210. The software 1250 may comprise one or more software modules and can be in the form of a computer program product that is software stored in a memory medium. The apparatus 1200 further comprises a camera unit 1260 and a viewfinder 1270 each coupled to the processor.

It shall be understood that any coupling in this document refers to functional or operational coupling; there may be intervening components or circuitries in between coupled elements.

The communication interface module 1220 is configured to provide local communications over one or more local links. The links may be wired and/or wireless links. The communication interface 1220 may further or alternatively implement telecommunication links suited for establishing links with other users or for data transfer (e.g. using the Internet). Such telecommunication links may be links using any of: wireless local area network links, Bluetooth, ultra-wideband, cellular or satellite communication links. The communication interface 1220 may be integrated into the apparatus 1200 or into an adapter, card or the like that may be inserted into a suitable slot or port of the apparatus 1200. While FIG. 12 shows one communication interface 1220, the apparatus may comprise a plurality of communication interfaces 1220.

The processor 1210 is, for instance, a central processing unit (CPU), a microprocessor, a digital signal processor (DSP), a graphics processing unit, an application specific integrated circuit (ASIC), a field programmable gate array, a microcontroller or a combination of such elements. FIG. 12 shows one processor 1210, but the apparatus 1200 may comprise a plurality of processors.

As mentioned in the foregoing, the memory 1240 may comprise volatile and a non-volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. In some example embodiments, only volatile or non-volatile memory is present in the apparatus 1200. Moreover, in some example embodiments, the apparatus comprises a plurality of memories. In some example embodiments, various elements are integrated. For instance, the memory 1240 can be constructed as a part of the apparatus 1200 or inserted into a slot, port, or the like. Further still, the memory 1240 may serve the sole purpose of storing data, or it may be constructed as a part of an apparatus serving other purposes, such as processing data. Similar options are thinkable also for various other elements.

A skilled person appreciates that in addition to the elements shown in FIG. 12, the apparatus 1200 may comprise other elements, such as microphones, displays, as well as additional circuitry such as further input/output (I/O) circuitries, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 1200 may comprise a disposable or rechargeable battery (not shown) for powering the apparatus when external power if external power supply is not available.

It is also useful to realize that the term apparatus is used in this document with varying scope. In some of the broader claims and examples, the apparatus may refer to only a subset of the features presented in FIG. 12 or even be implemented without any one of the features of FIG. 12. In one example embodiment term apparatus refers to the processor 1210.

Figure 13:
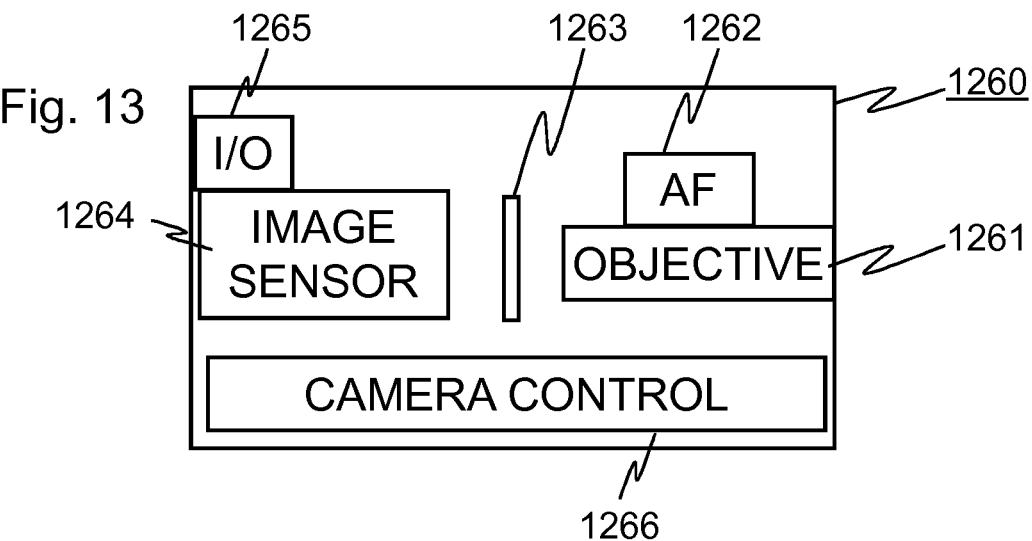
FIG. 13 shows a block diagram of a camera unit 1260 of an example embodiment of the invention.

FIG. 13 shows a block diagram of a camera unit 1260 of an example embodiment of the invention. The camera unit 1260 comprises an objective 1261, an autofocus unit 1262 configured to adjust focusing of the objective 1261, an optional mechanical shutter 1263, an image sensor 1264 and an input and/or output 1265. The camera unit 1260 is configured in one example embodiment to output autofocus information from the autofocus unit 1262. In one example embodiment, the camera unit is also configured to receive through the I/O 1265 camera control settings.

The camera unit 1260 further comprises, in one example embodiment, a camera control function 1266.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 12. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. An apparatus, comprising:
   an input configured to receive signals from a camera unit having an image sensor with a plurality of image detectors, the signals comprising first signals received from first pixel detectors corresponding to a first image area and second signals received from second pixel detectors corresponding to a second image area surrounding the first image area; and
   at least one processor configured to:
   receive the first and second signals from the input;
   automatically control camera settings of a setting group comprising at least one of focus control, exposure control and white balance control, based on the first signals;

predict changes in the setting group based on the second signals; and detect a change in the first image area and use the predicted changes to adapt the automatic control of the camera settings of the setting group;

the apparatus further comprising, an output configured to output control signals to the camera unit, the control signals being configured to control the camera settings of the setting group;

wherein:

the at least one processor is further configured to predict changes in the first and second signals; and the at least one processor is further configured to perform the predicting of the changes in the setting group based on the predicted changes in the first and second signals.

2. The apparatus of claim 1, wherein the at least one processor is further configured to detect changes in an image object from at least the other of the first and second signals and to use the detected changes in the image object in the predicting of the changes in the setting group.

3. The apparatus of claim 1, wherein the change in the first image area comprises changing field of view visible to the image sensor.

4. The apparatus of claim 1, wherein the change in the first image area comprises digital panning.

5. The apparatus of claim 1, wherein the change in the first image area comprises changing of an image object.

6. The apparatus of claim 1, wherein the second image area is received from a number of the first pixel detectors that is at least 50% of a number of the second pixel detectors.

7. The apparatus of claim 1, wherein the at least one processor is further configured to form segments for the first and second image areas based on image content in the first and second image areas.

8. The apparatus of claim 1, further comprising the image sensor.

9. The apparatus of claim 1, wherein the at least one processor is further configured to track an image object and to correspondingly change the first image area.

10. The apparatus of claim 1, wherein the at least one processor is further configured to perform image segmentation and to calculate image parameters for image segments formed in the image segmentation.

11. The apparatus of claim 10, wherein the at least one processor is further configured to predict next second image area location.

12. The apparatus of claim 10, wherein the at least one processor is further configured to predict next second image area location in a parallel process with the image segmentation.

13. The apparatus of claim 11, wherein the at least one processor configured to perform the predicting of the changes in the setting group based on the calculated image parameters and the predicted second image area location.

14. The apparatus of claim 10, wherein the at least one processor is further configured to predict active image segments for next second image area.

15. The apparatus of claim 10, wherein the at least one processor is further configured to predict active image segments for next second image area in a parallel process with the image segmentation.

16. The apparatus of claim 14, wherein the at least one processor configured to perform the predicting of the changes in the setting group based on the calculated image parameters and the predicted second image area location.

17. A method comprising:

receiving signals from a camera unit having an image sensor with a plurality of image detectors, the signals comprising first signals received from first pixel detectors corresponding to a first image area and second signals received from second pixel detectors corresponding to a second image area surrounding the first image area;

automatically controlling camera settings of a setting group comprising at least one of focus control, exposure control and white balance control, based on the first signals;

predicting changes in the setting group based on the second signals;

detecting a change in the first image area and using the predicted changes to adapt the automatic control of the camera settings of the setting group;

outputting control signals to the camera unit, the control signals being configured to control the camera settings of the setting group;

predicting changes in the first and second signals; and performing the predicting of the changes in the setting group based on the predicted changes in the first and second signals.

18. The method of claim 17, further comprising:

detecting changes in an image object from at least the other of the first and second signals; and using the detected changes in the image object in the predicting of the changes in the setting group.

* * * * *